United States Patent
Ishikawa et al.

(10) Patent No.: US 10,132,387 B2
(45) Date of Patent: Nov. 20, 2018

(54) CONTROL DEVICE FOR AUTOMATIC TRANSMISSION, AND CONTROL SYSTEM

(71) Applicant: HONDA MOTOR CO., LTD., Tokyo (JP)

(72) Inventors: Yutaka Ishikawa, Wako (JP); Yuya Tachibanada, Wako (JP); Mitsuo Ueda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 15/140,478

(22) Filed: Apr. 28, 2016

(65) Prior Publication Data

US 2016/0319915 A1  Nov. 3, 2016

(30) Foreign Application Priority Data

Apr. 30, 2015  (JP) .................................. 2015-093481

(51) Int. Cl.
*F16H 3/44* (2006.01)
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2082* (2013.01)

(58) Field of Classification Search
CPC ............... F16H 3/66; F16H 2200/0069; F16H 2200/2012; F16H 2200/2046; F16H 1/28; F16H 3/00; F16H 2059/683; F16H 61/0262; F16H 61/0265; F16H 61/664; Y10T 477/60
See application file for complete search history.

(56) References Cited

U.S. PATENT DOCUMENTS

| 2007/0015624 A1* | 1/2007 | Ota ........................ F16H 61/12 477/34 |
| 2011/0190994 A1* | 8/2011 | Itazu ...................... F16H 59/70 701/60 |

FOREIGN PATENT DOCUMENTS

JP  2014-173649  9/2014

* cited by examiner

*Primary Examiner* — Mark J Beauchaine
(74) *Attorney, Agent, or Firm* — Mori & Ward, LLP

(57) ABSTRACT

A mechanical engagement mechanism has regulation states out of a first state in which at least one of a plurality of rotating elements is rotatable only in a first direction and a second state in which the at least one of the plurality of rotating elements is not rotatable in both of the first direction and a second direction opposite to the first direction and a reverse gear position is to be established. A non-traveling gear position is to be established in the first state or in the second state. A processor is to switch the regulation states of the mechanical engagement mechanism from the second state to the first state when oil pressure that is detected by an oil pressure sensor becomes lower than a predetermined oil pressure after switching a shift position from the reverse gear position to the non-traveling gear position is detected.

9 Claims, 13 Drawing Sheets

FIG. 2A

|     | C1 | C2 | C3 | B1 | B2 | B3 | F1 | GEAR RATIO |
|-----|----|----|----|----|----|----|----|------------|
| RVS |    |    | ◯  |    | ◯  |    | ◯  | 4.008 |
| 1st |    |    |    | ◯  | ◯  | (◯) | △/◯ | 5.233 |
| 2nd |    | ◯  |    | ◯  | ◯  |    | (△) | 3.367 |
| 3rd |    |    | ◯  | ◯  | ◯  |    | (△) | 2.298 |
| 4th |    | ◯  | ◯  | ◯  |    |    | (△) | 1.705 |
| 5th | ◯  |    | ◯  | ◯  |    |    | (△) | 1.363 |
| 6th | ◯  | ◯  | ◯  |    |    |    | (△) | 1.000 |
| 7th | ◯  |    | ◯  |    | ◯  |    | (△) | 0.786 |
| 8th | ◯  | ◯  |    |    | ◯  |    | (△) | 0.657 |
| 9th | ◯  |    |    |    | ◯  | ◯  | (△) | 0.584 |
| 10th | ◯ | ◯  |    |    |    | ◯  | (△) | 0.520 |
| P/N |    |    |    |    |    |    | △/◯ | — |
| RPM | ◯  |    | ◯  |    |    | ◯  | △→◯ | — |

FIG. 2B

| PLANETARY GEAR MECHANISM | GEAR RATIO |
|---|---|
| P1 | 2.681 |
| P2 | 1.914 |
| P3 | 1.614 |
| P4 | 2.734 |

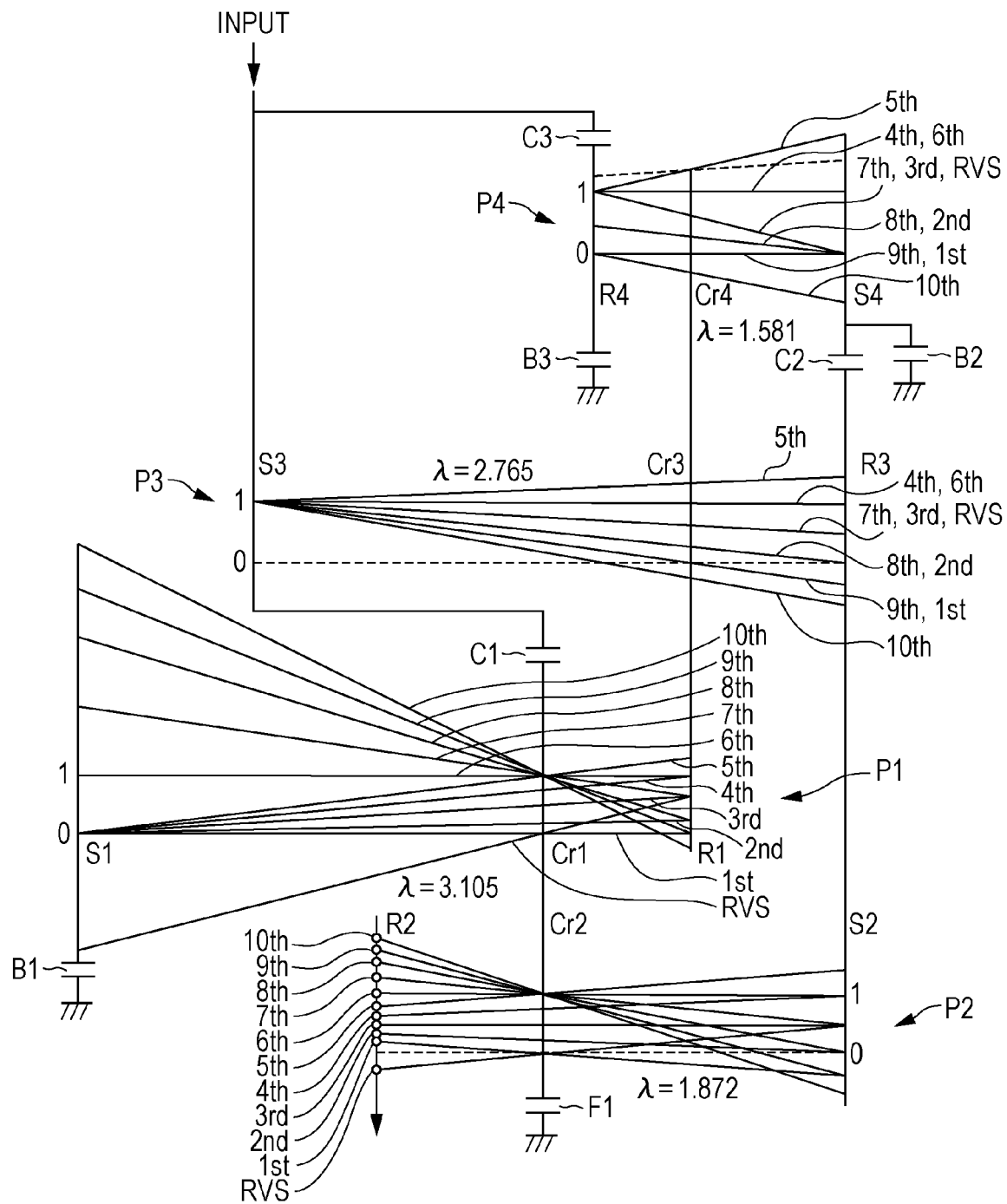

FIG. 5

↓ : RELEASING
○ : ENGAGED
— : RELEASED
F1/△ : UNIDIRECTIONAL ROTATION ALLOWED
F1/○ : ROTATION PREVENTED

| PHASE | ENGAGEMENT OPERATION | | | | | | | TRANSITION CONDITION |
|---|---|---|---|---|---|---|---|---|
| | B3 | B2 | B1 | C3 | C2 | C1 | F1 | |
| 1 | — | ↓ | ↓ | — | — | — | △ | RELEASE COMPLETED |
| 2 | ○ | — | — | ○ | — | ○ | △ | INPUT REVOLUTION SPEED ≈ 0, C1 ENGAGEMENT COMPLETED, AND SO FORTH |
| 3 | ○ | — | — | ○ | — | ○ | ○ | F1 SWITCHING COMPLETED |
| 4 | ↓ | ○ | — | ○ | — | ↓ | ○ | |

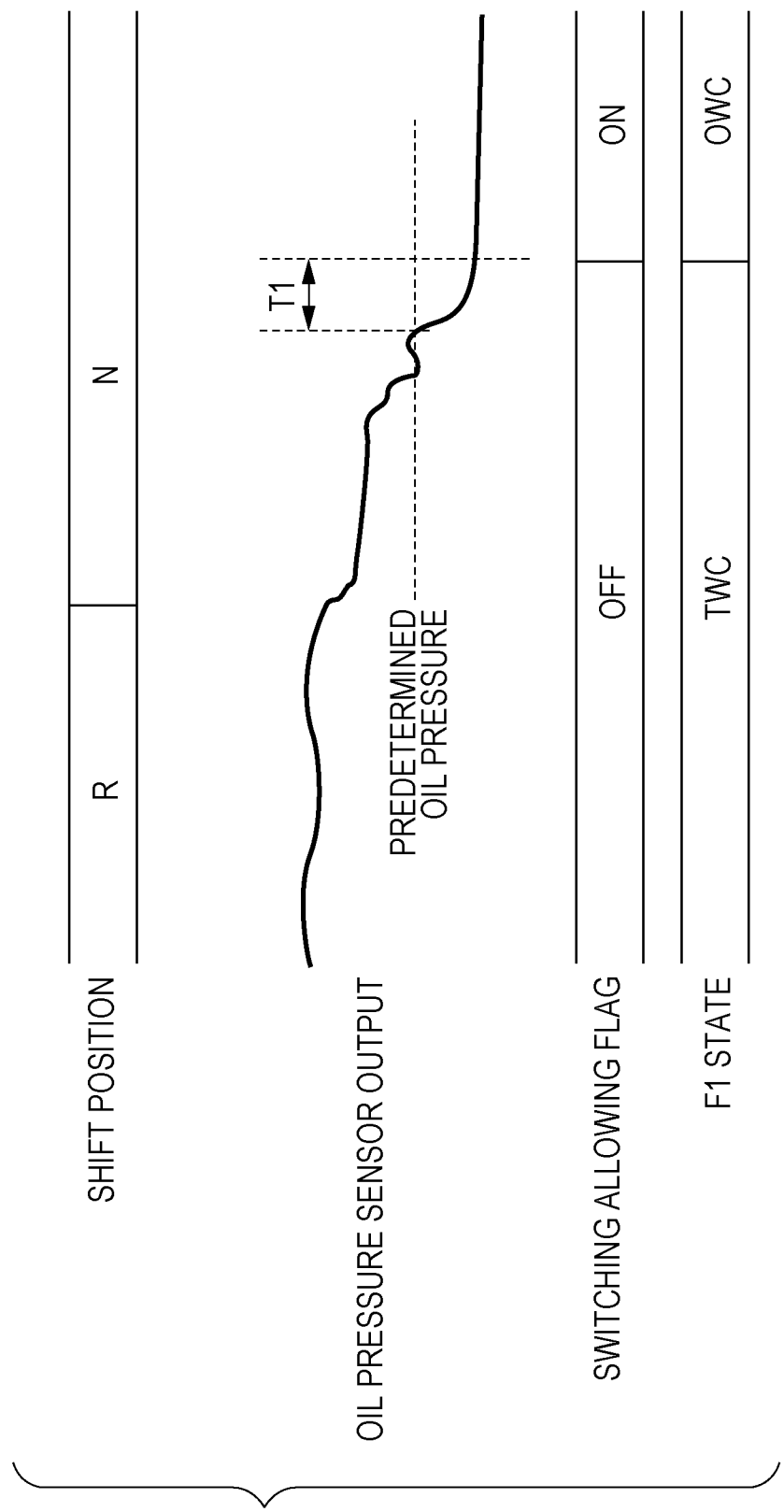

CONTROL DEVICE FOR AUTOMATIC TRANSMISSION, AND CONTROL SYSTEM

CROSS-REFERENCE TO RELATED APPLICATIONS

The present application claims priority under 35 U.S.C. § 119 to Japanese Patent Application No. 2015-093481, filed Apr. 30, 2015, entitled "Control Device." The contents of this application are incorporated herein by reference in their entirety.

BACKGROUND

Field of the Invention

The present disclosure relates to a control device for an automatic transmission, and a control system.

Discussion of the Background

An automatic transmission in general includes planetary gear mechanisms and engagement mechanisms such as clutches and brakes, switches power transmission paths by the engagement mechanisms, and thereby realizes gear positions. As the engagement mechanism, employment of a mechanical engagement mechanism as well as a hydraulic engagement mechanism has been suggested. Particularly, a configuration has been suggested in which a clutch (two-way clutch) that may be switched into a state where the clutch regulates bidirectional rotation is used as a brake (for example, Japanese Unexamined Patent Application Publication No. 2014-173649).

SUMMARY

According to one aspect of the present invention, a control device for an automatic transmission is provided. The automatic transmission includes: an input shaft to which driving force is input; an output member; plural planetary gear mechanisms that transmit the driving force which is input to the input shaft to the output member; and plural engagement mechanisms that are capable of establishing plural gear positions by switching transmission paths of the driving force in the plural planetary gear mechanisms, one of the plural engagement mechanisms is a mechanical engagement mechanism that functions as a brake, the mechanical engagement mechanism is capable of being switched between a first state where only rotation in a first direction of a prescribed rotating element among plural rotating elements included in the plural planetary gear mechanisms is regulated and a second state where rotation in both of the first direction and a second direction that is opposite to the first direction of the prescribed rotating element is regulated, the plural engagement mechanisms include plural hydraulic engagement mechanisms, the plural gear positions include: a forward gear position in which the first state of the mechanical engagement mechanism is capable of being established; and a reverse gear position in which the second state of the mechanical engagement mechanism is established, at least one hydraulic engagement mechanism of the plural hydraulic engagement mechanisms is set to an engaged state in the reverse gear position, the control device includes: a shift position detection unit that detects a shift position; an oil pressure detection unit that detects an oil pressure of the hydraulic engagement mechanism which is set to the engaged state in the reverse gear position; and a control unit that is capable of switching states of the mechanical engagement mechanism, and the control unit is capable of switching the mechanical engagement mechanism from the second state to the first state under a condition that the oil pressure that is detected by the oil pressure detection unit becomes lower than a predetermined oil pressure in a case where the shift position detection unit detects switching from a reverse range to a non-traveling range.

According to another aspect of the present invention, a control system includes an automatic transmission and a control device. The automatic transmission includes an input shaft, an output member, a plurality of planetary gear mechanisms, and a plurality of engagement mechanisms. Driving force is input to the input shaft. The plurality of planetary gear mechanisms are disposed between the input shaft and the output member to transmit the driving force which is input from the input shaft to the output member. The plurality of planetary mechanisms include a plurality of rotating elements. The plurality of engagement mechanisms connect the plurality of rotating elements to switch a transmission path of the driving force which passes the plurality of planetary gear mechanisms to establish one of a plurality of gear positions. The plurality of engagement mechanisms include a mechanical engagement mechanism and at least one hydraulic engagement mechanism. The mechanical engagement mechanism connects at least one of the plurality of rotating elements to regulate a rotation of the at least one of the plurality of rotating elements. The mechanical engagement mechanism has regulation states out of a first state in which the at least one of the plurality of rotating elements is rotatable only in a first direction and a second state in which the at least one of the plurality of rotating elements is not rotatable in both of the first direction and a second direction opposite to the first direction. The regulation states are to be switched. The at least one hydraulic engagement mechanism is to have a first oil pressure to engage at least two of the plurality of rotating elements and to have a second oil pressure lower than the first oil pressure to disengage the at least two of the plurality of rotating elements. The plurality of gear positions includes a forward gear position, a reverse gear position, and a non-traveling gear position. The forward gear position is to be established in the first state. The reverse gear position is to be established in the second state. The at least one hydraulic engagement mechanism is to engage the at least two of the plurality of rotating elements in the reverse gear position. The non-traveling gear position is to be established in the first state or the second state. The at least one hydraulic engagement mechanism is to disengage the at least two of the plurality of rotating elements in the non-traveling gear position. The control device includes a shift position sensor, an oil pressure sensor, and a processor. The shift position sensor is to detect a shift position out of the forward gear position, the reverse gear position, and the non-traveling gear position. The oil pressure sensor is to detect an oil pressure of the at least one hydraulic engagement mechanism. The processor is to switch the regulation states of the mechanical engagement mechanism from the second state to the first state when the oil pressure that is detected by the oil pressure sensor becomes lower than a predetermined oil pressure after the shift position sensor detects switching the shift position from the reverse gear position to the non-traveling gear position.

According to further aspect of the present invention, a control device for an automatic transmission includes a shift position sensor, an oil pressure sensor, and a processor. The shift position sensor is to detect a shift position out of a forward gear position, a reverse gear position, and a non-traveling gear position of the automatic transmission. The oil pressure sensor is to detect an oil pressure of at least one hydraulic engagement mechanism of the automatic transmission. The at least one hydraulic engagement mechanism is to have a first oil pressure to engage at least two of a plurality of rotating elements of a plurality of planetary gear mechanisms of the automatic transmission to set the reverse gear position and to have a second oil pressure lower than the first oil pressure to disengage the at least two of the plurality of rotating elements to set the forward gear position or the non-traveling gear position. The plurality of planetary gear mechanisms includes at least one of the plurality of rotating elements connected to a mechanical engagement mechanism. The mechanical engagement mechanism is to regulate a rotation of the at least one of the plurality of rotating elements. The mechanical engagement mechanism has regulation states out of a first state and a second state. In the first state, the at least one of the plurality of rotating elements is rotatable only in a first direction and the forward gear position is to be established. In the second state, the at least one of the plurality of rotating elements is not rotatable in both of the first direction and a second direction opposite to the first direction and the reverse gear position is to be established. The non-traveling gear position is to be established in the first state or in the second state. The processor is to switch the regulation states of the mechanical engagement mechanism from the second state to the first state when the oil pressure that is detected by the oil pressure sensor becomes lower than a predetermined oil pressure after the shift position sensor detects switching the shift position from the reverse gear position to the non-traveling gear position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2A is a diagram that illustrates an example of an engagement table of engagement mechanisms, and FIG. 2B is a diagram that illustrates gear ratios of planetary gear mechanisms.

FIG. 3 is a velocity diagram of the automatic transmission of FIG. 1.

FIG. 5 is an outline explanation diagram of a process in a case of selecting a reverse range.

FIG. 11 is a timing diagram that illustrates a control example.

DESCRIPTION OF THE EMBODIMENTS

Figure 1:
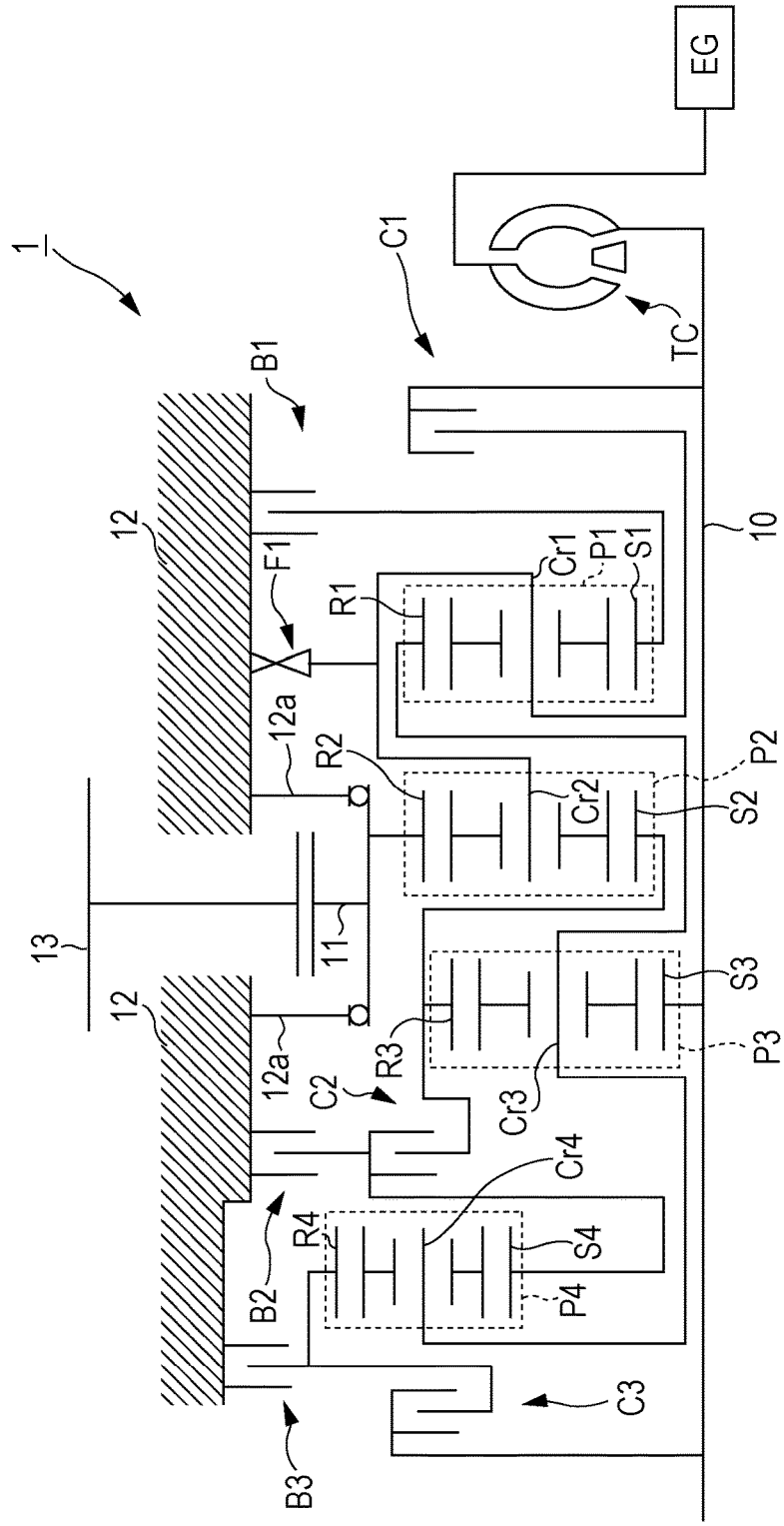
FIG. 1 is a skeleton diagram of an automatic transmission according to one embodiment of the present disclosure.

The embodiments will now be described with reference to the accompanying drawings, wherein like reference numerals designate corresponding or identical elements throughout the various drawings.

FIG. 1 is a skeleton diagram of an automatic transmission 1 according to one embodiment of the present disclosure. Referring to FIG. 1, the automatic transmission 1 includes an input shaft 10 that is pivotally supported in a rotatable manner in a casing 12 which configures a transmission case, an output member 11 that is supported coaxially with the input shaft 10 in a rotatable manner by a support member 12a supported by the casing 12, and an output shaft (counter shaft) 13.

Driving force from an internal combustion engine EG (which may simply be referred to as EG) is input to the input shaft 10, and the input shaft 10 rotates by the driving force. A starting device is provided between the input shaft 10 and the internal combustion engine EG. Examples of the starting device may include a starting device of a clutch type (such as a single-disc clutch and a multiple-disc clutch) and a starting device of a fluid coupling type (such as a torque converter). This embodiment employs a torque converter TC. Thus, the driving force of the internal combustion engine EG is input to the input shaft 10 via the torque converter TC.

The output member 11 includes a gear that is coaxial with the input shaft 10, and the output shaft 13 has a gear that meshes with the gear. Rotation of the input shaft 10 is transmitted to the output shaft 13 while the speed of the rotation is changed by a transmission mechanism, which will be described below. Rotation (driving force) of the output shaft 13 is transmitted to a driving wheel via a differential gear device, which is not illustrated, for example.

The automatic transmission 1 includes planetary gear mechanisms P1 to P4 and engagement mechanisms C1 to C3, B1 to B3, and F1 as the transmission mechanisms. In this embodiment, each of the planetary gear mechanisms P1 to P4 is a planetary gear mechanism of a single pinion type. The planetary gear mechanisms P1 to P4 transmit driving force from the input shaft 10 to the output member 11. The planetary gear mechanisms P1 to P4 are capable of forming plural transmission paths of driving force. The engagement mechanisms C1 to C3, B1 to B3, and F1 switch the transmission paths of driving force in the planetary gear mechanisms P1 to P4 and thereby establish plural gear positions.

The planetary gear mechanisms P1 to P4 respectively include sun gears S1 to S4, ring gears R1 to R4, and carriers Cr1 to Cr4 that support pinion gears as rotating elements (12 elements in total) and are disposed coaxially with the input shaft 10.

In the order of arrangement at the intervals that corresponds to the gear ratios in the velocity diagram of FIG. 3, which will be described later, the sun gear S1, the carrier Cr1, and the ring gear R1 of the planetary gear mechanism P1 may be, in this order, referred to as a first rotating element, a second rotating element, and a third rotating element.

Similarly, the ring gear R2, the carrier Cr2, and the sun gear S2 of the planetary gear mechanism P2 may be, in this order, referred to as a fourth rotating element, a fifth rotating element, and a sixth rotating element.

Similarly, the sun gear S3, the carrier Cr3, and the ring gear R3 of the planetary gear mechanism P3 may be, in this order, referred to as a seventh rotating element, an eighth rotating element, and a ninth rotating element.

Similarly, the ring gear R4, the carrier Cr4, and the sun gear S4 of the planetary gear mechanism P4 may be, in this order, referred to as a tenth rotating element, an eleventh rotating element, and a twelfth rotating element.

The engagement mechanisms C1 to C3, B1 to B3, and F1 function as clutches or brakes. The clutches perform connection or disconnection between the rotating elements included in the automatic transmission 1. The brakes perform connection or disconnection between the rotating elements included in the automatic transmission 1 and the casing 12. The rotating elements included in the automatic transmission 1 include the input shaft 10 and the sun gears, the ring gears, and the carriers of the planetary gear mechanisms P1 to P4.

In this embodiment, the engagement mechanisms C1 to C3 are clutches, and the engagement mechanisms B1 to B3 and F1 are brakes. Accordingly, the engagement mechanisms C1 to C3 may be referred to as clutches C1 to C3, and the engagement mechanisms B1 to B3 and F1 may be referred to as brakes B1 to B3 and F1. The engagement mechanisms C1 to C3 and B1 to B3 are switched between an engaged state (fastened state) and a released state, states of the engagement mechanism F1 are switched, and the transmission paths of driving force from the input shaft 10 to the output member 11 are thereby switched. Accordingly, plural gear positions are realized.

This embodiment is described on an assumption that all the engagement mechanisms C1 to C3 and B1 to B3 are hydraulic frictional engagement mechanisms. Examples of the hydraulic frictional engagement mechanisms may include a dry or wet single-disc clutch, a dry or wet multiple-disc clutch, and so forth.

The engagement mechanism F1 is provided between prescribed rotating elements (here, the carriers Cr1 and Cr2 that are coupled with each other) and the casing 12. The engagement mechanism F1 may be switched into a unidirectional rotation allowing state where only the rotation in one direction of the prescribed rotating elements (the carriers Cr1 and Cr2) is regulated and the rotation in the reverse direction is allowed (which may be referred to as OWC) and a rotation preventing state where the rotation in both of the directions is regulated (which may be referred to as TWC).

The unidirectional rotation allowing state is a state that provides the same function as a so-called one-way clutch and where a drive is transmitted in one rotational direction but the rotating element runs idle in the reverse direction. In this embodiment, the engagement mechanism F1 functions as a brake. Thus, in a case where the engagement mechanism F1 is in the unidirectional rotation allowing state, only the rotation in one direction of the prescribed rotating elements (the carriers Cr1 and Cr2) is allowed. The rotation preventing state is a state where a drive is transmitted in both of the rotational directions. In this embodiment, the engagement mechanism F1 functions as a brake. Thus, in a case where the engagement mechanism F1 is in the rotation preventing state, the rotation in both of the directions of the prescribed rotating elements (the carriers Cr1 and Cr2) is prevented.

Although a structure example of the engagement mechanism F1 will be described later, a known two-way clutch may be employed, for example. There is a known two-way clutch in which switching among the unidirectional rotation allowing state, the rotation preventing state, and a bidirectional rotation allowing state may be performed by drive control of corresponding hydraulic actuators or electromagnetic actuators. Further, there is a known two-way clutch in which the unidirectional rotation allowing state may further be switched into a forward rotation allowing state and a reverse rotation allowing state. In this embodiment, it is sufficient that switching may be performed between the unidirectional rotation allowing state and the rotation preventing state and also sufficient that the state that allows rotation in one direction may be used as the unidirectional rotation allowing state. However, a two-way clutch that may select another state such as the bidirectional rotation allowing state may be employed.

A description will next be made about the coupling relationships among configurations with reference to FIG. 1.

The sun gear S3 of the planetary gear mechanism P3 is coupled with the input shaft 10. The ring gear R3 is coupled with the sun gear S2 of the planetary gear mechanism P2. The carrier Cr3 is coupled with the ring gear R1 of the planetary gear mechanism P1 and the carrier Cr4 of the planetary gear mechanism P4. The carrier Cr2 of the planetary gear mechanism P2 is coupled with the carrier Cr1 of the planetary gear mechanism P1. The ring gear R2 is coupled with the output member 11. Accordingly, the planetary gear mechanism P2 is a planetary gear mechanism that performs drive transmission to the output shaft 13.

The clutch C1 couples the input shaft 10, the carrier Cr1 of the planetary gear mechanism P1, and the carrier Cr2, which is coupled with the carrier Cr1, together in the engaged state and releases the coupling among those in the released state. The released state may be referred to as engagement released state. The clutch C2 couples the ring gear R3 of the planetary gear mechanism P3 and the sun gear S4 of the planetary gear mechanism P4 together in the engaged state and releases the coupling between those in the released state. The clutch C3 couples the input shaft 10 and the ring gear R4 of the planetary gear mechanism P4 together in the engaged state and releases the coupling between those in the released state.

The brake B1 couples the casing 12 and the sun gear S1 of the planetary gear mechanism P1 together in the engaged state and releases the coupling between those in the released state. The brake B2 couples the casing 12 and the sun gear S4 of the planetary gear mechanism P4 together in the engaged state and releases the coupling between those in the released state. The brake B3 couples the casing 12 and the ring gear R4 of the planetary gear mechanism P4 together in the engaged state and releases the coupling between those in the released state.

As described above, the brake F1 regulates only the rotation in one direction of the carrier Cr2 of the planetary gear mechanism P2 (and the carrier Cr1 coupled with the carrier Cr2) in the unidirectional rotation allowing state and causes the carrier Cr2 of the planetary gear mechanism P2 (and the carrier Cr1 coupled with the carrier Cr2) to be fixed to the casing 12 in the rotation preventing state.

Next, FIG. 2A is an engagement table (fastening table) that illustrates engagement combinations of the engagement mechanisms included in the automatic transmission 1. FIG. 2B illustrates the gear ratios of the planetary gear mechanisms included in the automatic transmission 1. FIG. 3 is the velocity diagram of the automatic transmission 1. The "gear ratio" in FIG. 2A indicates the gear ratios between the input shaft 10 and the output member 11.

In this embodiment, 10 forward gear positions (1st to 10th) and 1 reverse gear position (RVS) may be established. "P/N" indicates a non-traveling range, "P" indicates a parking range, and "N" indicates a neutral range. "RPM" indicates engagement combinations in an RVS preparation process, which will be described later. In this process, the brake F1 is switched from the unidirectional rotation allowing state to the rotation preventing state.

In examples in the engagement table of FIG. 2A, a symbol "○" indicates the engaged state, and absence of symbol indicates the released state. The engagement table includes the engagement mechanisms that are set to the engaged state for smooth shifting to higher or lower adjacent gear positions although those engaged states are not necessarily needed for establishment of the gear positions. For example, in a case of the first gear position (1st), the engagement of the brake B2 is not necessarily needed. However, in a case where shifting is performed to the reverse gear position (RVS) or to the second gear position (2nd), the concerned engagement mechanisms are set to the engaged state for the purpose of reducing the engagement mechanisms whose states of engagement are switched. Similarly, in a case of the fifth gear position (5th), the engagement of the clutch C3 is not necessarily needed. However, in a case where shifting is performed to the fourth gear position (4th) or to the sixth gear position (6th), the concerned engagement mechanisms are set to the engaged state for the purpose of reducing the engagement mechanisms whose states of engagement are switched.

As for the brake F1, the symbol "○" indicates the rotation preventing state, and a symbol "Δ" indicates the unidirectional rotation allowing state. In the case of the first gear position (1st), the brake F1 may be in either one of the rotation preventing state and the unidirectional rotation allowing state. However, in a case of the rotation preventing state, engine braking is enabled. In the first gear position, in a case where the brake F1 is in the unidirectional rotation allowing state, enabling and disabling of the engine braking may be switched in accordance with engagement and release of the brake B3. In FIG. 2A, an expression "(○)" of the brake B3 in the first gear position (1st) indicates the above case.

Algorithms for selecting which state of the brake F1 in the case of the first gear position (1st) may appropriately be designed. However, in this embodiment, it is assumed that the state prior to shifting to the first gear position (1st) is maintained. For example, in a case where shifting is performed from the reverse gear position (RVS) to the first gear position (1st), the rotation preventing state is maintained in the first gear position (1st). However, in a case where the vehicle speed becomes higher than a prescribed speed, or the like, the state is switched to the unidirectional rotation allowing state. Similarly, in a case where shifting is performed from another forward gear position (2nd to 10th) to the first gear position (1st), the unidirectional rotation allowing state is maintained in the first gear position (1st).

Also in the non-traveling range (P/N), the brake F1 may be in either one of the rotation preventing state and the unidirectional rotation allowing state. In this embodiment, similarly to the first gear position (1st), the state prior to shifting to the non-traveling range (P/N) is maintained in principle. However, the state of the brake F1 is switched in a case where a prescribed switching condition is satisfied.

In the second gear position (2nd) to the tenth gear position (10th), the brake F1 is set to the unidirectional rotation allowing state. However, an idling state occurs because of the configuration of the automatic transmission 1. Thus, the state of the brake F1 is indicated as "(Δ)". Hypothetically, in a case where the brake F1 is a mechanical engagement mechanism that may select the above-described bidirectional rotation allowing state, the brake F1 may be set to the bidirectional rotation allowing state in the second gear position (2nd) to the tenth gear position (10th).

This embodiment employs a configuration in which the unidirectional rotation allowing state is selected as the state of the brake F1 in each of the second gear position (2nd) to the tenth gear position (10th). Thus, those gear positions may not be established in the rotation preventing state. However, a configuration in which the rotation preventing state is selected may be employed depending on the configuration of the automatic transmission 1.

The velocity diagram of FIG. 3 illustrates rotational speed ratios of the elements with respect to the input to the input shaft 10 in the gear positions. The vertical axis represents the speed ratio. "1" indicates the same rotational frequency as the input shaft 10, and "0" indicates a stopped state. The horizontal axis is based on the gear ratios between the rotating elements of the planetary gear mechanisms P1 to P4. λ indicates the gear ratio between the carrier Cr and the sun gear S. In FIG. 3, elements that correspond to the output shaft 13 are not illustrated.

Control Device

Figure 4A:
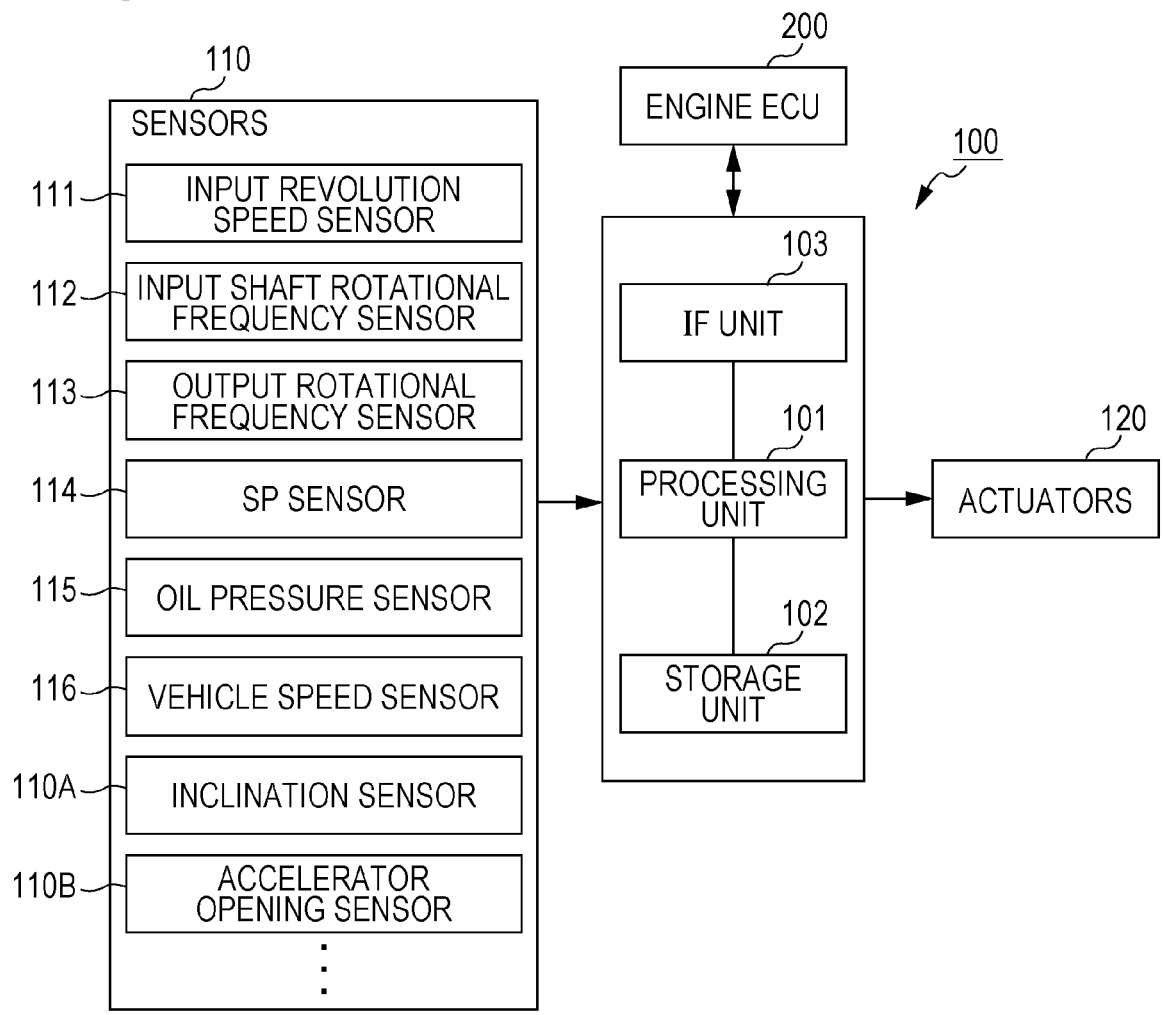
FIG. 4A is a block diagram that illustrates an example of a control device of the automatic transmission of FIG. 1.
Figure 4B:
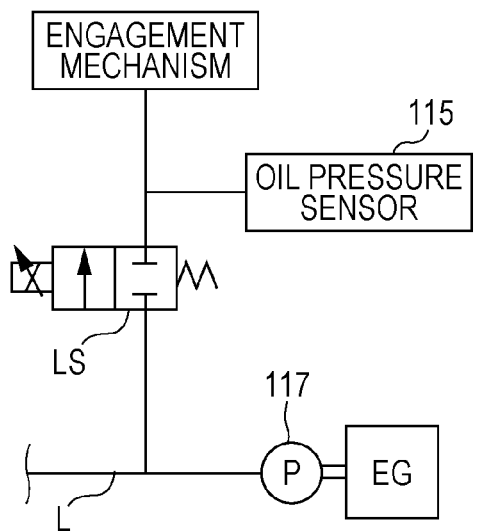
FIG. 4B is a diagram that illustrates a disposition example of an oil pressure sensor.

FIGS. 4A and 4B are block diagrams of a control device 100 of the automatic transmission 1. The control device 100 may perform not only control of the automatic transmission 1 but also control of the internal combustion engine EG and torque converter TC. However, in this embodiment, a configuration is assumed in which the internal combustion engine EG is controlled by an engine ECU 200 that is separately provided from the control device 100. The control device 100 may receive various kinds of information about the internal combustion engine EG and the vehicle from the engine ECU 200. Further, the control device 100 may transmit information about the automatic transmission 1 to the engine ECU 200.

The control device 100 includes a processing unit 101 (a processor 101) such as a CPU, a storage unit 102 such as a RAM or a ROM, and an IF unit 103 that serves as an interface of the processing unit 101 with external devices and the engine ECU. The IF unit 103 is configured with a communication interface, an input-output interface, or the like, for example.

The processing unit 101 executes programs stored in the storage unit 102 and controls various actuators 120 based on detection results of the various sensors 110.

The various sensors 110 include various sensors that are provided in the automatic transmission 1. FIGS. 4A and 4B exemplify the following sensors.

An input revolution speed sensor 111 is a sensor that detects the revolution speed of revolutions, which are input from the internal combustion engine EG to the torque converter TC, that is, the rotational frequency (rotational speed) of an output shaft of the internal combustion engine EG. An input shaft rotational frequency sensor 112 is a sensor that detects the rotational frequency (rotational speed) of the input shaft 10. An output rotational frequency sensor 113 is a sensor that detects the rotational frequency (rotational speed) of the output shaft 13.

A shift position sensor (SP sensor) 114 is a sensor that detects the shift position selected by a driver. In this embodiment, four kinds of ranges, which are a P range (parking range), a D range (forward range), an N range (neutral range), and an R range (reverse range), are assumed as shift positions. In a case where the D range is selected, the processing unit 101 selects any one of the first gear position (1st) to the tenth gear position (10th) in accordance with a shift map stored in the storage unit 102 and performs shifting. In a case where the R range is selected, the processing unit 101 selects the reverse gear position.

An oil pressure sensor 115 includes sensors that detect the oil pressures of hydraulic oil of the engagement mechanisms C1 to C3 and B1 to B3. A vehicle speed sensor 116 detects the traveling speed of the vehicle in which the automatic transmission 1 is installed.

An inclination sensor 110A detects an inclination of a road on which the vehicle is traveling. An accelerator opening sensor 110B detects an accelerator opening. For example, the accelerator opening sensor 110B detects a rotation amount of an accelerator pedal.

The various actuators 120 include various actuators that are provided in the automatic transmission 1. For example, the various actuators 120 include electromagnetic actuators such as electromagnetic solenoids that switch operation states of the engagement mechanisms C1 to C3, B1 to B3, and F1. Accordingly, the processing unit 101 controls the various actuators 120.

FIG. 4B illustrates a disposition example of the oil pressure sensor 115. The oil pressure sensor 115 may be provided for each of the engagement mechanisms C1 to C3 and B1 to B3, for example. Accordingly, the oil pressures of the hydraulic oil of the engagement mechanisms may be detected. The oil pressure sensor 115 does not necessarily have to be provided for each of the engagement mechanisms.

A solenoid valve LS that supplies the hydraulic oil is allocated to each of the engagement mechanisms. A supply line L of the hydraulic oil is opened or blocked by the solenoid valve LS, and the engagement mechanism may thereby be switched between engagement and release. The oil pressure sensor 115 is provided to be supplied with the hydraulic oil that is supplied from the solenoid valve LS to the engagement mechanism, and the detection result of the oil pressure sensor 115 indicates the oil pressure of the hydraulic oil supplied to the engagement mechanism. The hydraulic oil is pressure-fed to the supply line L by an oil pump 117 driven by the internal combustion engine EG.

TWC Switching Control of Brake F1

In this embodiment, the brake F1 is in the rotation preventing state in the reverse gear position. In a case where switching is performed from the forward gear positions or the non-traveling range to the reverse gear position, the brake F1 may be switched from the unidirectional rotation allowing state to the rotation preventing state. In this case, in order to reduce generation of abnormal sound and vibration, the rotational frequency difference between the casing 12 side and the carrier Cr2 side of the brake F1 is preferably zero. In other words, the rotational frequency of the carrier Cr2 is preferably zero.

Thus, the shifting is allowed to go through a combination of the engagement mechanisms, in which the rotational frequency of the carrier Cr2 becomes zero. In this embodiment, because a sensor that directly measures the rotational frequency of the carrier Cr2 is not provided, the carrier Cr2 and the input shaft 10 are coupled together, and whether the rotational frequency of the carrier Cr2 is zero is thereby confirmed based on the detection result and so forth of the input shaft rotational frequency sensor 112. Subsequently, the brake F1 is switched to the rotation preventing state.

FIG. 5 illustrates engagement combinations of the engagement mechanisms in a case where the gear position is switched from the first forward gear position to the reverse gear position. In a case where the gear position is in the first forward gear position, the brakes B1 and B2 are in the engaged state as illustrated in FIG. 2A. The brake F1 is assumed to be in the unidirectional rotation allowing state.

As illustrated in phase 1 in FIG. 5, the brakes B1 and B2 are controlled to be in the released state. When the release of the brakes B1 and B2 is completed, the process transits to next phase 2.

In phase 2, the clutches C1, C3, and the brake B3 are engaged. The ring gear R2 and the output shaft 13 are rotatable, and the driving wheel is thus capable of free rotation. Accordingly, unexpected behavior of vehicle may be avoided.

As it is clear from the velocity diagram of FIG. 3, the clutch C3 and the brake B3 are engaged, and the input shaft 10 is thereby fixed to the casing 12. The clutch C1 is engaged, and the carrier Cr2 is thereby coupled with the input shaft 10.

In this embodiment, phase 2 is performed after phase 1. However, phase 1 and phase 2 may be performed simultaneously. Specifically, while control for making the brakes B1 and B2 the released state is performed, control for engaging the clutches C1, C3, and the brake B3 may be performed. Accordingly, responsiveness in switching the gear position to the reverse gear position may be improved.

Next, when a prescribed condition is satisfied, the process transits to next phase 3. The prescribed condition is a condition in which the rotational frequency of the carrier Cr2 is confirmed to be zero. The condition is basically satisfied by completion of the engagement of the clutch C1 and the detection result of the input revolution speed sensor 111<a prescribed value (for example, a value that may be assumed to be zero). As for the completion of the engagement of the clutch C1, a determination may be made that the engagement is completed in a case where the detection result of a C1 oil pressure sensor 115 indicates a prescribed oil pressure, a case where the control amount about the solenoid valve LS for the clutch C1 reaches a predetermined value, or the like, for example. A similar determination scheme may be employed for completion of engagement of the other engagement mechanisms.

In phase 3, the brake F1 is switched from the unidirectional rotation allowing state to the rotation preventing state. Because the rotational frequency difference between the casing 12 side and the carrier Cr2 side of the brake F1 is zero, generation of abnormal sound and vibration may be avoided. When the switching of the brake F1 is completed, the process progresses to phase 4. In phase 4, the clutches C1 and the brake B3 are released, and the brake B2 is engaged. The combination for the reverse gear position is established by the above process (FIG. 2A).

Processes of phases 2 and 3 may be referred to as RVS preparation process, and a process of phase 4 may be referred to as RVS gearing process. In the controlling, the RVS preparation mode is set as a control state of the gear positions when phase 1 is completed, and the RVS preparation process is performed when the RVS preparation mode is set. Further, the RVS gearing mode is set as a control state of the gear positions when phase 3 is completed, and the RVS gearing process is performed when the RVS gearing mode is set. Such mode settings are managed by providing a storage area for mode information in the storage unit 102, for example.

A description will be made about process examples related to control contents of FIG. 5, which are executed by the processing unit 101, with reference to FIGS. 6A and 6B.

Figure 6A:
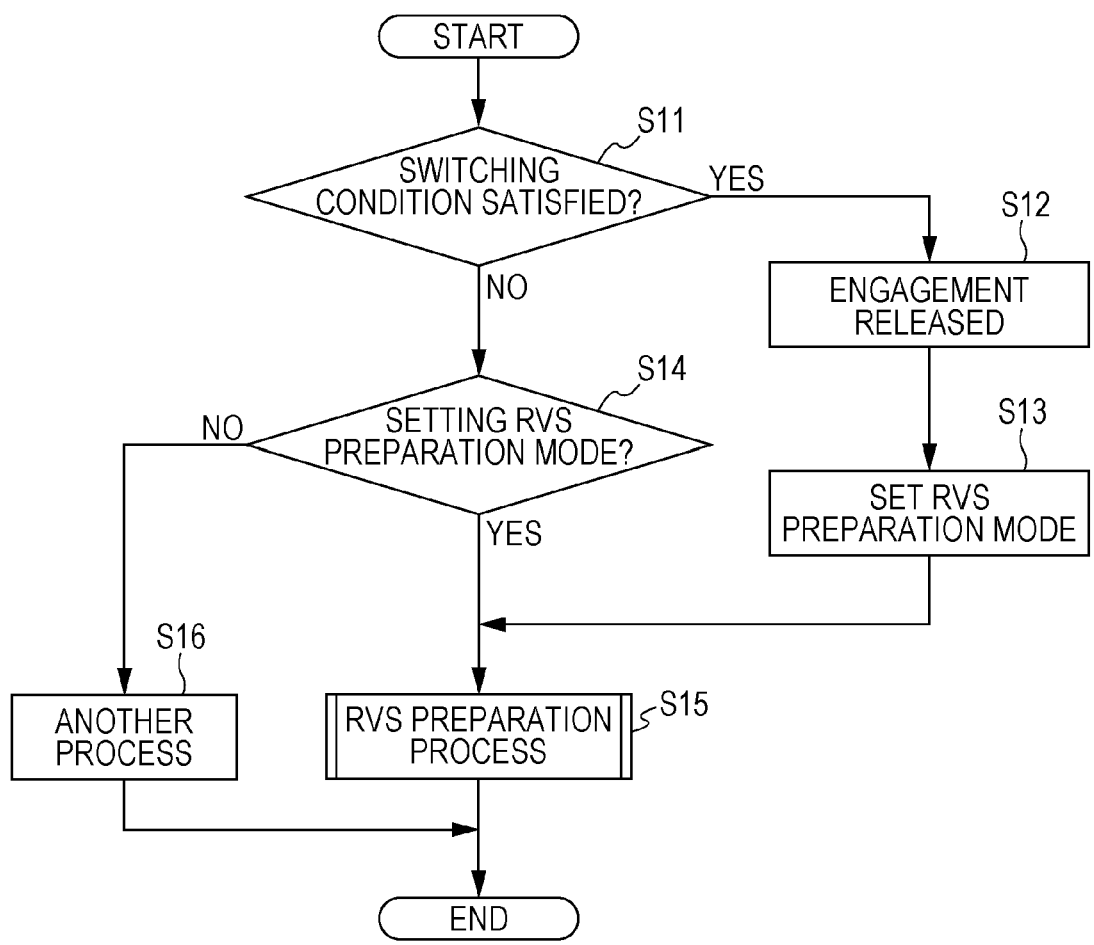
FIGS. 6A and 6B are flowcharts that illustrate process examples of the control device of FIGS. 4A and 4B.

FIG. 6A will be referred to. In S11, a determination is made whether or not a condition for switching the brake F1 from the unidirectional rotation allowing state to the rotation preventing state is satisfied. In this embodiment, in a case where the brake F1 is in the unidirectional rotation allowing state and where the SP sensor 114 detects that the driver switches the shift range from another range to the reverse range, a determination is made that the condition is satisfied. The process progresses to S12 in a case where the condition is satisfied but progresses to S14 in a case where the condition is not satisfied.

As described in phase 1 of FIG. 5, the engagement mechanisms in the engaged state (for example, the brakes B1 and B2) are released in S12. In S13, the RVS preparation mode is set as a control mode. The process thereafter progresses to S15.

In S14, a determination is made whether or not the RVS preparation mode is being set. The process progresses to S15 in a case where the RVS preparation mode is being set but progresses to S16 in a case where the RVS preparation mode is not being set. In S15, the RVS preparation process is performed. Details will be described later. In S16, another process is performed, and one set of processes are then finished.

Figure 6B:
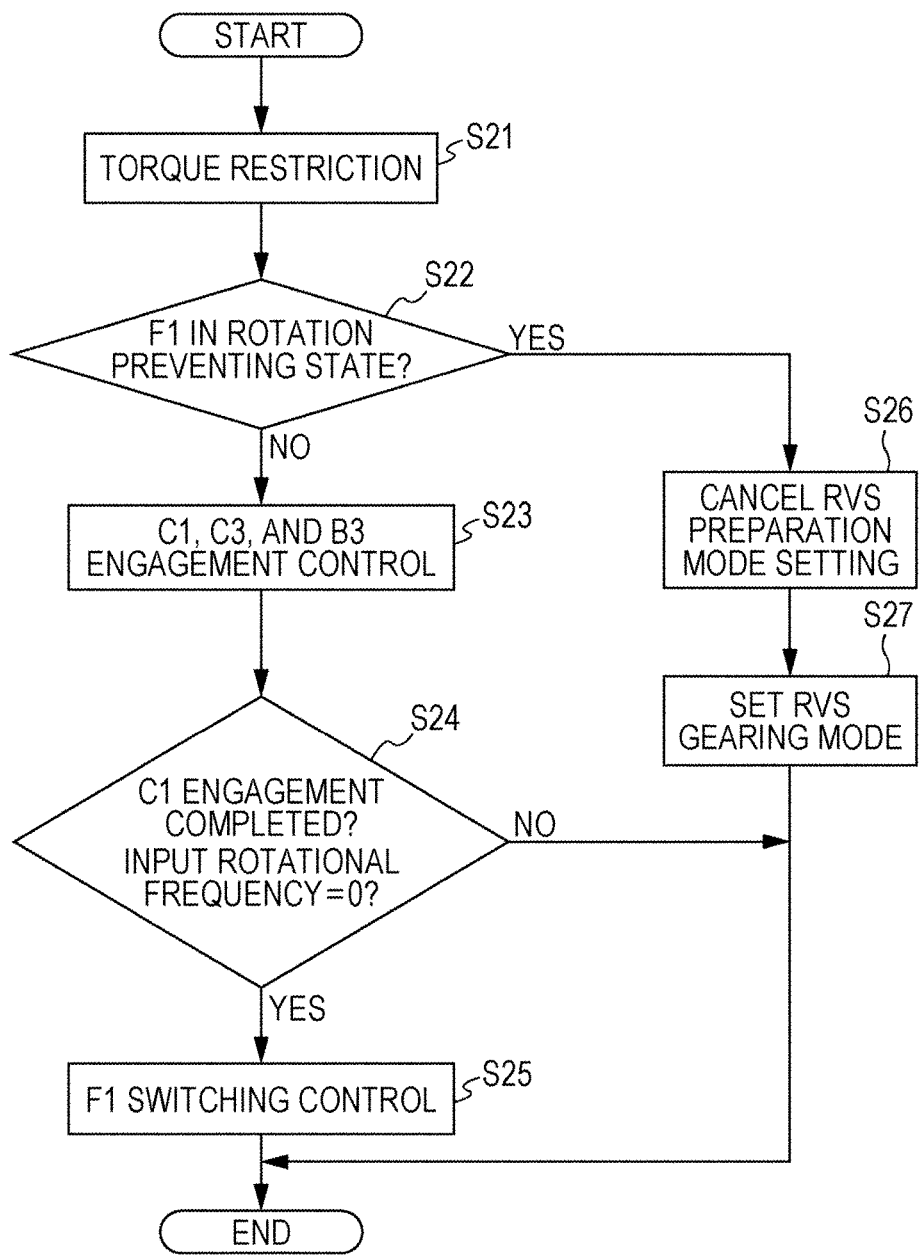

FIG. 6B will be referred to. FIG. 6B is a flowchart that illustrates the RVS preparation process of S15. In S21, torque restriction of a drive source of the automatic transmission 1 is executed. For example, the output of the internal combustion engine EG is reduced in a range in which necessary oil pressures of the engagement mechanisms and so forth are secured.

In S22, a determination is made whether or not switching of the brake F1 to the rotation preventing state is completed. The process progresses to S26 in a case where the switching is completed but progresses to S23 in a case where the switching is not completed.

In step 23, as described in phase 2 of FIG. 5, control for engaging the clutches C1, C3, and the brake B3 is started. The engagement of the clutches C1, C3, and the brake B3 may be performed by stepwise increasing the control amounts of the respective solenoid valves LS. A step of S23 is repeated plural times, and the engagement is thereby completed.

In S24, as described in phase 2 of FIG. 5, a determination is made whether or not the engagement of the clutch C1 is completed and the rotational frequency of the input shaft 10 is 0. The process progresses to S25 in a case where both of those conditions are satisfied. One set of processes are finished in a case where the conditions are not satisfied.

In S25, as described in phase 3 of FIG. 5, the state of the brake F1 is switched to the rotation preventing state. Because the switching is performed in a state where the rotational frequency difference between the casing 12 side and the carrier Cr2 side of the brake F1 is zero, generation of abnormal sound and vibration may be prevented, and breakage of the brake F1 may be avoided.

In S26, the setting of the RVS preparation mode is canceled. In S27, the RVS gearing mode is set. In this setting, as described in phase 4 of FIG. 5, a process for releasing the clutch C1 and the brake B3 and engaging the brake B2 is performed in a separate routine (for example, S16 of FIG. 6A). Accordingly, the process is finished.

Mechanical Engagement Mechanism

The brake F1 is a configuration that performs mechanical drive transmission. In this kind of engagement mechanism, switching between states may not be performed smoothly depending on the application state of a load to the engagement portion on the inside. This point will be described below.

Figure 7:
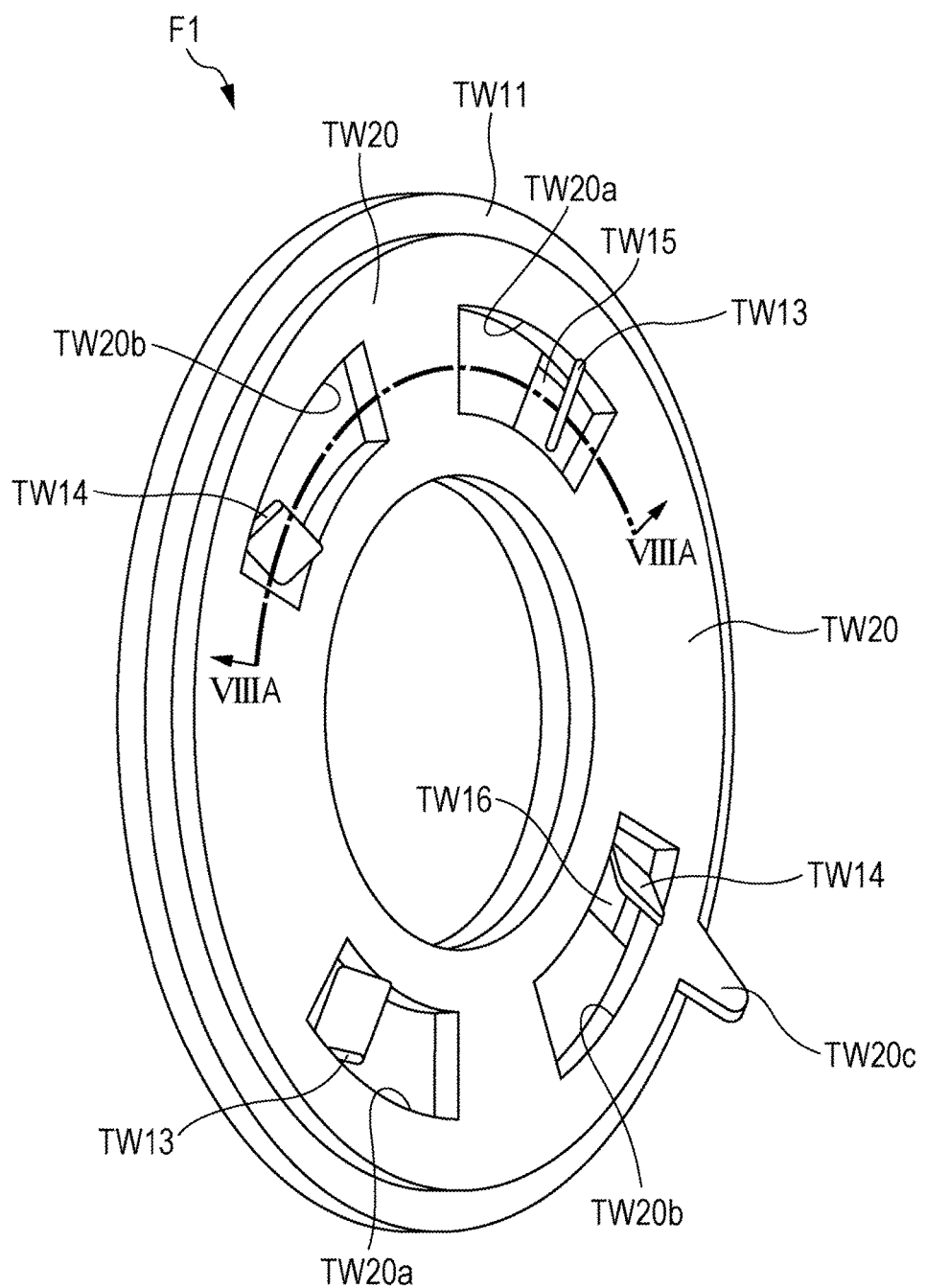
FIG. 7 is an explanation diagram of the mechanical engagement mechanism.
Figure 8A:
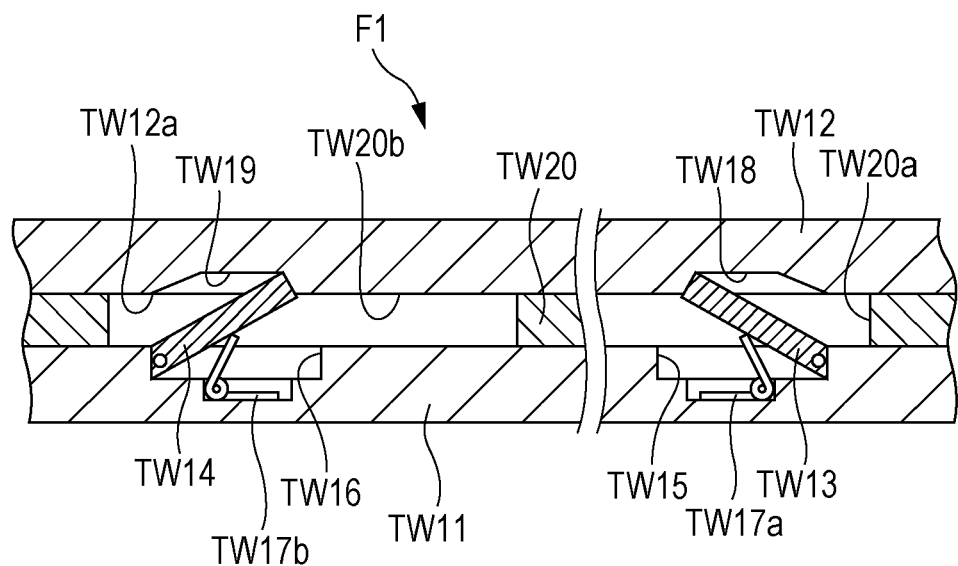
FIGS. 8A and 8B are explanation diagrams of the mechanical engagement mechanism.

FIG. 7 is a partial perspective diagram that illustrates a structure example of the brake F1 in this embodiment. FIG. 8A is a cross-sectional view taken along line VIIIA-VIIIA in FIG. 7.

The brake F1 includes a fixed plate TW11 that is fixed to the casing 12, a rotating plate TW12 (not illustrated in FIG. 7) that is fixed to the carriers Cr1 and Cr2, and a switching plate TW20. The fixed plate TW11 is formed into an annular shape (donut shape). Further, the rotating plate TW12 is formed into an annular shape (donut shape), similarly to the fixed plate TW11. The fixed plate TW11 and the rotating plate TW12 are concentrically arranged.

Housing portions TW15 and TW16 are formed in the fixed plate TW11. The housing portion TW15 is provided with a swing portion TW13, which is swingable. Further, the housing portion TW16 is provided with a swing portion TW14, which is swingable. The centers of swing of the swing portion TW13 and the swing portion TW14 are positioned at mutually opposite ends. The housing portion TW15 is provided with a spring TW17a that urges the swing portion TW13 in one direction. The housing portion TW16 is provided with a spring TW17b that urges the swing portion TW14 in one direction.

In the rotating plate TW12, a recess TW18 that engages the swing portion TW13 is formed, and a recess TW19 that engages the swing portion TW14 is formed.

The switching plate TW20 is arranged between the fixed plate TW11 and the rotating plate TW12. The switching plate TW20 is also formed into an annular shape (donut shape). The switching plate TW20 is provided with notch holes TW20a and TW20b in positions that correspond to the swing portions TW13 and TW14. An outer rim of the switching plate TW20 is provided with a protrusion TW20c that protrudes outward in the radial direction. The switching plate TW20 is swingable with respect to the fixed plate TW11. The protrusion TW20c is urged by an electromagnetic actuator or a hydraulic actuator, and the switching plate TW20 may thereby be swung with respect to the fixed plate TW11.

FIG. 8A illustrates the rotation preventing state. That is, the swing portion TW13 engages the recess TW18, and the swing portion TW14 engages the recess TW19. Thus, the rotating plate TW12 is not capable of relative rotation to the fixed plate TW11.

Figure 8B:
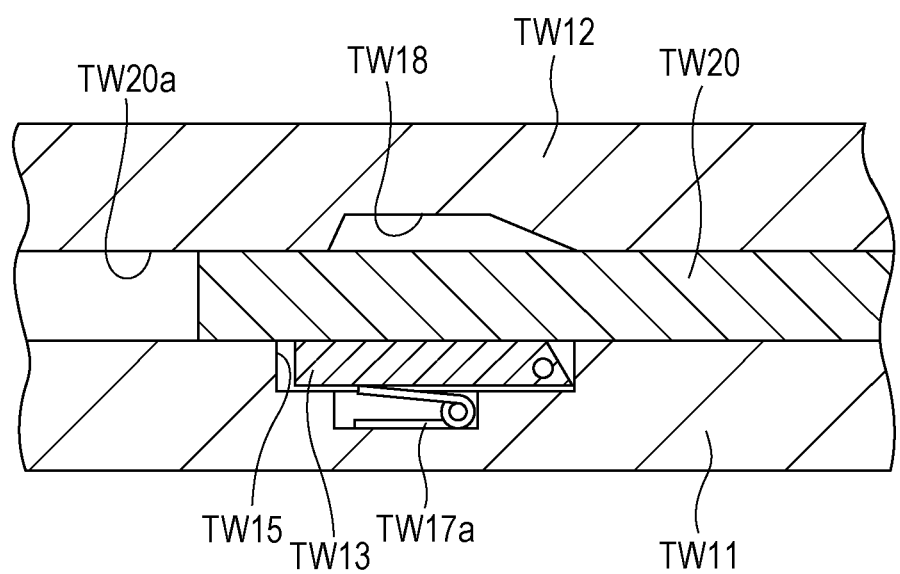

The switching plate TW20 is swung in the rotation preventing state, and switching to the unidirectional rotation allowing state may thereby be performed. FIG. 8B illustrates one example of such switching. The example of FIG. 8B illustrates a state where the switching plate TW20 moves and the swing portion TW13 is thereby pressed to an edge of the notch hole TW20a of the switching plate TW20 and housed in the housing portion TW15. Accordingly, the engagement between the swing portion TW13 and the recess TW18 is released. In this state, the engagement between the swing portion TW14 and the recess TW19 is maintained. Thus, the rotating plate TW12 is capable of rotating in one direction with respect to the fixed plate TW11 (the unidirectional rotation allowing state).

Accordingly, switching between the rotation preventing state and the unidirectional rotation allowing state may be performed in accordance with the position of the switching plate TW20.

Figure 9A:
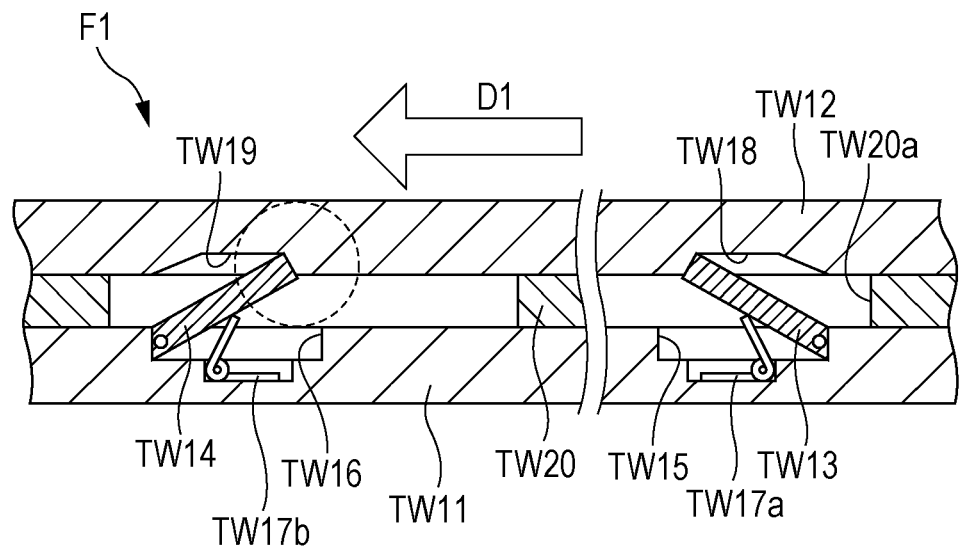
FIGS. 9A and 9B are explanation diagrams of the mechanical engagement mechanism.
Figure 9B:
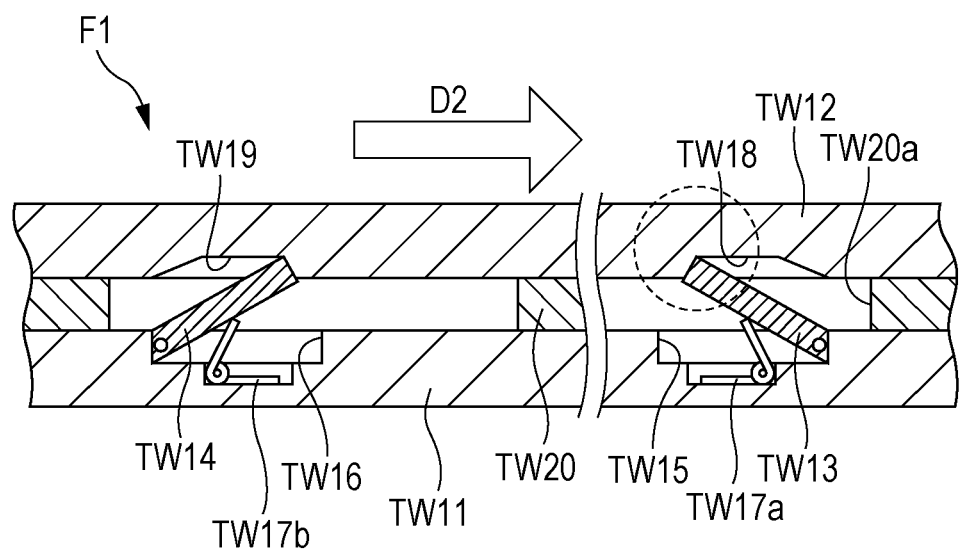

Next, a description will be made about a load applied to the brake F1. In this embodiment, as described above, the engine braking is enabled in a case where the brake F1 is in the rotation preventing state in the first gear position. FIGS. 9A and 9B will be referred to. In FIGS. 9A and 9B, a case is assumed where the brake F1 is in the rotation preventing state in the first gear position.

FIG. 9A illustrates an accelerating situation in forward traveling, in which the driving force of the internal combustion engine EG is applied to the rotating plate TW12 fixed to the carriers Cr1 and Cr2 in the arrow D1 direction. This load is born by the swing portion TW14 but is not born by the swing portion TW13. Thus, the switching plate TW20 is swung, and switching to the unidirectional rotation allowing state in FIG. 8B may thereby be performed.

FIG. 9B illustrates an accelerating situation in reverse traveling, in which the driving force of the internal combustion engine EG is applied to the rotating plate TW12 fixed to the carriers Cr1 and Cr2 in the arrow D2 direction. This load is born by the swing portion TW13 but is not born by the swing portion TW14. Even if an attempt is made to swing the swing portion TW13 to the state of FIG. 8B by swinging the switching plate TW20, because an end of the swing portion TW13 engages the recess TW18, switching may not be performed smoothly.

In this embodiment, the clutch C3 and the brake B2 are in the engaged state in a case where the reverse gear position is selected. In a case where the traveling range is switched from the reverse range to the non-traveling range (P or N range), the clutch C3 and the brake B2 are released. Thus, the carriers Cr1 and Cr2 would become free from rotation, and the load would not be applied to the swing portion TW13.

However, because the clutch C3 and the brake B2 are hydraulic engagement mechanisms, releasing control of those does not immediately lower supplied oil pressures, and residual pressures generate engaging forces. This results in a case where the load is applied to the swing portion TW13 after the releasing control of the clutch C3 and the brake B2 is performed and also results in a case where the brake F1 is not smoothly switched to the unidirectional rotation allowing state.

Thus, in this embodiment, decreases in the supplied oil pressures to the clutch C3 and the brake B2 are confirmed, and the brake F1 is thereafter switched to the unidirectional rotation allowing state. Accordingly, the switching may be performed after the load on the brake F1 decreases, and the switching of the brake F1 may more certainly be performed. Examples of such control will be described below.

OWC Switching Control of Brake F1

Figure 10A:
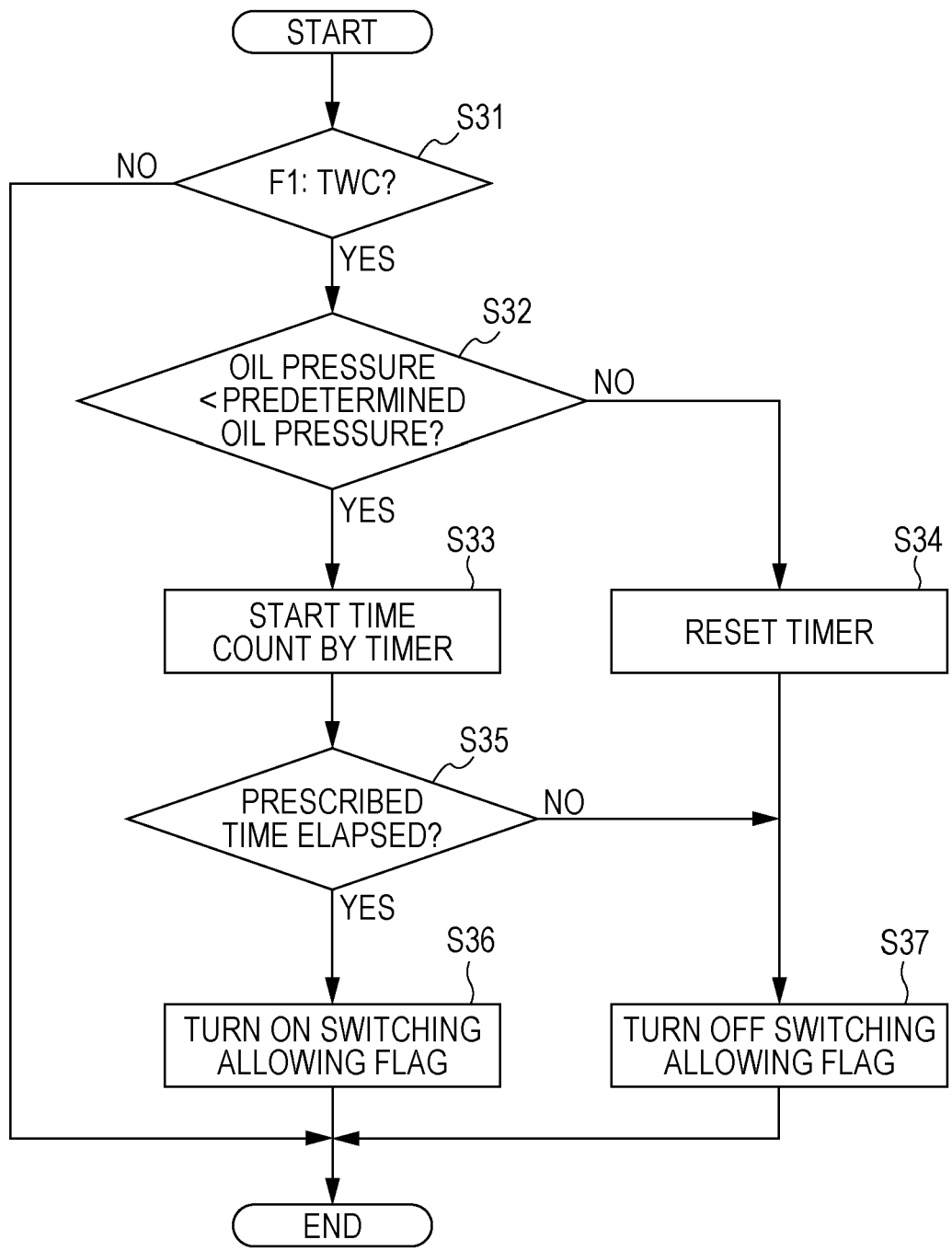
FIGS. 10A and 10B are flowcharts that illustrate process examples of the control device of FIGS. 4A and 4B.
Figure 10B:
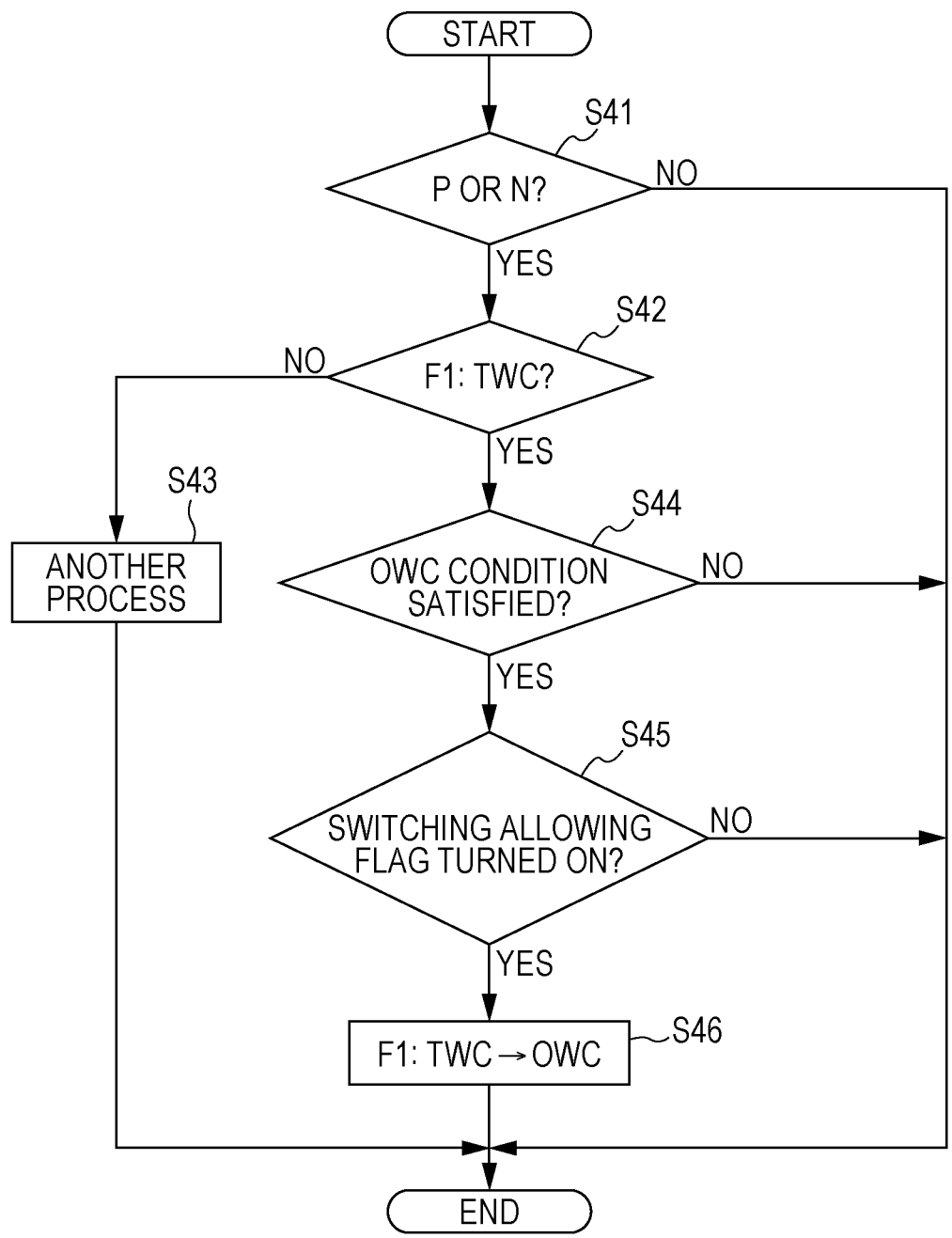

A description will be made about process examples that are executed by the processing unit 101 in relation to switching control for switching the brake F1 from the TWC (the rotation preventing state) to the OWC (the unidirectional rotation allowing state) with reference to FIGS. 10A and 10B. FIG. 10A is a process example for determining whether or not switching of the brake F1 from the TWC to the OWC is allowed, which may be performed by using switching of the traveling range from the R range to the P range or N range as a trigger. FIG. 10B illustrates a process example in which the brake F1 is switched from the TWC to the OWC in the P range or N range.

Referring FIG. 10A, in S31, a determination is made whether or not the brake F1 is in the TWC. The process progresses to S32 in a case where the brake F1 is in the TWC. One set of processes are finished in a case of the OWC.

In S32, a determination is made whether or not the oil pressures of the clutch C3 and the brake B2 are lower than predetermined oil pressures. The oil pressures of the clutch C3 and the brake B2 are identified from the detection results of the corresponding oil pressure sensors 115. The predetermined oil pressures are set with the oil pressures of the clutch C3 and the brake B2 in the released state being references. The process progresses to S33 in a case where the oil pressure detection results of both of the clutch C3 and the brake B2 are lower than the predetermined oil pressures. The process progresses to S34 in a case where the oil pressure detection result of at least one of those is equal to or higher than the predetermined oil pressure. A timer starts time count in S33, and the process progresses to S35. The timer is reset in S34, and the process progresses to S37.

This timer is a timer that counts time in which a state where the oil pressures of the clutch C3 and the brake B2 are lower than the predetermined oil pressures are maintained. Although a configuration may be employed in which the timer does not count the time, because the oil pressures of the clutch C3 and the brake B2 may decrease while fluctuating until the oil pressures of the clutch C3 and the brake B2 become lower than the predetermined oil pressures, the release of the clutch C3 and the brake B2 may more certainly be confirmed by waiting until those oil pressures certainly become lower than the predetermined oil pressures.

In S35, a determination is made whether or not the state where the oil pressures of the clutch C3 and the brake B2 are lower than predetermined oil pressures is maintained for a prescribed time based on the time count by the timer. The process progresses to S36 in a case where the state is maintained but progresses to S37 in a case where the state is not maintained. A switching allowing flag is turned ON in S36, and the switching allowing flag is turned OFF in S37. The switching allowing flag is a flag that allows the brake F1 to be switched from the TWC to the OWC.

Referring FIG. 10B, in S41, a determination is made whether or not the present traveling range is the P range or N range based on the detection result of the SP sensor 114. The process progresses to S42 in a case of the P range or N range. One set of processes are finished in a case of the other ranges. In S42, a determination is made whether or not the brake F1 is in the TWC. The process progresses to S44 in a case of the TWC. In a case of the OWC, another process for the OWC is performed in S43, and one set of processes are finished.

In S44, a determination is made whether or not the OWC condition is satisfied. The process progresses to S45 in a case where the OWC condition is satisfied. One set of processes are finished in a case where the OWC condition is not satisfied. The OWC condition is a condition for switching the brake F1 from the TWC to the OWC, and a determination is made by a process of S44 whether the TWC is maintained or switching to the OWC is performed. In a case where the P range or N range is selected as the shift range, either selection of the reverse gear position or the forward gear position is then possible. In a case where the forward gear position is selected, it may be advantageous to switch the brake F1 to the OWC. In a case where the reverse gear position is selected, it may be advantageous to maintain the brake F1 in the TWC.

The OWC condition in the P range is a case where a stopping place is a slope, for example. In this case, because it is highly possible that the vehicle travels forward and down on the slope, the brake F1 is switched to the OWC. Whether or not the stopping place is a slope may be determined based on the detection result of the inclination sensor 110A, for example.

The OWC condition in the N range is a case where the vehicle travels forward and down on a slope, for example. Because the vehicle is already traveling forward, the brake F1 is switched to the OWC. Whether or not the vehicle travels down on a slope may be determined based on the detection result of the inclination sensor 110A, for example. Alternatively, the vehicle travels down on a slope in a case where the detection result of the vehicle speed sensor 116 indicates forward acceleration.

In S45, a determination is made whether or not the switching allowing flag is turned ON. The process progresses to S46 in a case where the switching allowing flag is ON. One set of processes are finished in a case where the switching allowing flag is OFF. In S46, the brake F1 is switched from the TWC to the OWC. The brake F1 is switched from the TWC to the OWC as described above. Accordingly, in a case where switching is performed from the reverse range to the non-traveling range, the switching of the brake F1 may be performed after the clutch C3 and the brake B2 are released and the decreases in the residual pressures of the oil pressures are confirmed. Because the switching may be performed after the load on the brake F1 decreases, the switching of the brake F1 may more certainly be performed.

FIG. 11 is a timing diagram that illustrates an example of the change in the outputs of the oil pressure sensors 115 of the clutch C3 and the brake B2 and examples of the changes in the switching allowing flag and the state of the brake F1 in a case where the shift position is switched from the reverse range to the N range.

When the shift position is switched from the reverse range to the N range, the clutch C3 and the brake B2 are released, and the oil pressures start lowering. The state where the oil pressures are lower than the predetermined oil pressures is maintained for a prescribed time T1, the switching allowing flag changes from OFF to ON, and the brake F1 is switched from the TWC to the OWC.

CONCLUSION OF EMBODIMENTS

A control device (100, for example) of the above embodiment is a control device for an automatic transmission (1, for example), in which the automatic transmission includes: an input shaft (10, for example) to which driving force is input; an output member (11, for example); plural planetary gear mechanisms (P1 to P4, for example) that transmit the driving force which is input to the input shaft to the output member; and plural engagement mechanisms (C1 to C3, B1 to B3, and F1, for example) that are capable of establishing plural gear positions by switching transmission paths of the driving force in the plural planetary gear mechanisms, one of the plural engagement mechanisms is a mechanical engagement mechanism (F1, for example) that functions as a brake, the mechanical engagement mechanism is capable of being switched between a first state (OWC, for example) where only rotation in a first direction (D1, for example) of a prescribed rotating element (Cr1 and Cr2, for example) among plural rotating elements included in the plural planetary gear mechanisms is regulated and a second state (TWC, for example) where rotation in both of the first direction and a second direction (D2, for example) that is opposite to the first direction of the prescribed rotating element is regulated, the plural engagement mechanisms include plural hydraulic engagement mechanisms (C1 to C3 and B1 to B3, for example), the plural gear positions include: a forward gear position (1st to 10th, for example) in which the first state of the mechanical engagement mechanism is capable of being established; and a reverse gear position (RVS, for example) in which the second state of the mechanical engagement mechanism is established, at least one hydraulic engagement mechanism (C3 and B2, for example) of the plural hydraulic engagement mechanisms is set to an engaged state in the reverse gear position, the control device includes: a shift position detection unit (114, for example) that detects a shift position; an oil pressure detection unit (115, for example) that detects an oil pressure of the hydraulic engagement mechanism which is set to the engaged state in the reverse gear position; and a control unit (101, for example) that is capable of switching states of the mechanical engagement mechanism, and the control unit is capable of switching the mechanical engagement mechanism from the second state to the first state (S46, for example) under a condition that the oil pressure that is detected by the oil pressure detection unit becomes lower than a predetermined oil pressure (S32 and S45, for example) in a case where the shift position detection unit detects switching from the reverse range to a non-traveling range (S41, for example).

In such a configuration, in a case where the switching is performed from the reverse range to the non-traveling range, switching of the mechanical engagement mechanism is performed after release of engagement of the hydraulic engagement mechanisms in the engaged state is confirmed by the oil pressures. Thus, switching may be performed after the load on the mechanical engagement mechanism decreases. Thus, switching of the mechanical engagement mechanism may more certainly be performed.

In the control device (100, for example) of the above embodiment, the control unit may be capable of switching the mechanical engagement mechanism from the second state to the first state under a condition that a state where the oil pressure that is detected by the oil pressure detection unit becomes lower than the predetermined oil pressure is maintained for a prescribed time (S35 and S45, for example).

In such a configuration, release of engagement of the hydraulic engagement mechanisms in the engaged state may more certainly be confirmed.

In the control device (100, for example) of the above embodiment, the control unit may determine whether the second state is maintained or switching to the first state is performed in a case where the shift position detection unit detects switching from the reverse range to a non-traveling range (S44, for example), and may be capable of switching the mechanical engagement mechanism from the second state to the first state under the condition that the oil pressure that is detected by the oil pressure detection unit becomes lower than the predetermined oil pressure (S32 and S45, for example) in a case where a determination is made that switching to the first state is performed.

In such a configuration, the second state may be maintained in a case where it is highly possible that the shift position is returned to the reverse range, and the reverse gear position may thereby be established more quickly in a case where the reverse range is selected.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for an automatic transmission, wherein the automatic transmission includes
an input shaft to which driving force is input,
an output member,
plural planetary gear mechanisms that transmit the driving force which is input to the input shaft to the output member, and
plural engagement mechanisms that are capable of establishing plural gear positions by switching transmission paths of the driving force in the plural planetary gear mechanisms,
one of the plural engagement mechanisms is a mechanical engagement mechanism that functions as a brake,
the mechanical engagement mechanism is capable of being switched between a first state where only rotation in a first direction of a prescribed rotating element among plural rotating elements included in the plural planetary gear mechanisms is regulated and a second state where rotation in both of the first direction and a second direction that is opposite to the first direction of the prescribed rotating element is regulated, the plural engagement mechanisms include plural hydraulic engagement mechanisms, the plural gear positions include
- a forward gear position in which the first state of the mechanical engagement mechanism is capable of being established, and
- a reverse gear position in which the second state of the mechanical engagement mechanism is established, at least one hydraulic engagement mechanism of the plural hydraulic engagement mechanisms is set to an engaged state in the reverse gear position, the control device includes
- a shift position detection unit that detects a shift position,
- an oil pressure detection unit that detects an oil pressure of the hydraulic engagement mechanism which is set to the engaged state in the reverse gear position, and
- a control unit that is capable of switching states of the mechanical engagement mechanism, and the control unit switches the mechanical engagement mechanism from the second state to the first state under a condition that the oil pressure that is detected by the oil pressure detection unit becomes lower than a predetermined oil pressure in a case where the shift position detection unit detects switching from a reverse range to a non-traveling range.

2. The control device according to claim 1, wherein the control unit is capable of switching the mechanical engagement mechanism from the second state to the first state under a condition that a state where the oil pressure that is detected by the oil pressure detection unit becomes lower than the predetermined oil pressure is maintained for a prescribed time.

3. The control device according to claim 1, wherein the control unit
- determines whether the second state is maintained or switching to the first state is performed in a case where the shift position detection unit detects switching from the reverse range to a non-traveling range, and
- is capable of switching the mechanical engagement mechanism from the second state to the first state under the condition that the oil pressure that is detected by the oil pressure detection unit becomes lower than the predetermined oil pressure in a case where a determination is made that switching to the first state is performed.

4. A control system comprising:
an automatic transmission comprising:
an input shaft to which driving force is input;
an output member;
a plurality of planetary gear mechanisms disposed between the input shaft and the output member to transmit the driving force which is input from the input shaft to the output member, the plurality of planetary mechanisms including a plurality of rotating elements; and
a plurality of engagement mechanisms connecting the plurality of rotating elements to switch a transmission path of the driving force which passes the plurality of planetary gear mechanisms to establish one of a plurality of gear positions, the plurality of engagement mechanisms comprising:
- a mechanical engagement mechanism connecting at least one of the plurality of rotating elements to regulate a rotation of the at least one of the plurality of rotating elements, the mechanical engagement mechanism having regulation states out of a first state in which the at least one of the plurality of rotating elements is rotatable only in a first direction and a second state in which the at least one of the plurality of rotating elements is not rotatable in both of the first direction and a second direction opposite to the first direction, the regulation states to be switched; and
- at least one hydraulic engagement mechanism to have a first oil pressure to engage at least two of the plurality of rotating elements and to have a second oil pressure lower than the first oil pressure to disengage the at least two of the plurality of rotating elements, the plurality of gear positions comprising:
- a forward gear position to be established in the first state;
- a reverse gear position to be established in the second state, the at least one hydraulic engagement mechanism to engage the at least two of the plurality of rotating elements in the reverse gear position; and
- a non-traveling gear position to be established in the first state or the second state, the at least one hydraulic engagement mechanism to disengage the at least two of the plurality of rotating elements in the non-traveling gear position; and a control device comprising:
- a shift position sensor to detect a shift position out of the forward gear position, the reverse gear position, and the non-traveling gear position;
- an oil pressure sensor to detect an oil pressure of the at least one hydraulic engagement mechanism; and
- a processor programmed to switch the regulation states of the mechanical engagement mechanism from the second state to the first state when the oil pressure that is detected by the oil pressure sensor becomes lower than a predetermined oil pressure after the shift position sensor detects switching the shift position from the reverse gear position to the non-traveling gear position.

5. The control system according to claim 4, wherein the processor is to switch the regulation states of the mechanical engagement mechanism from the second state to the first state after the oil pressure that is detected by the oil pressure sensor continues to be lower than the predetermined oil pressure for a prescribed time.

6. The control system according to claim 4, wherein the processor is
- to determine whether the second state is maintained or switching to the first state is performed after the shift position sensor detects switching from the reverse gear position to the non-traveling gear position, and
- to switch the regulation states of the mechanical engagement mechanism from the second state to the first state when the oil pressure that is detected by the oil pressure sensor becomes lower than the predetermined oil pressure after a determination is made that switching to the first state is performed.

7. A control device for an automatic transmission, comprising:
- a shift position sensor to detect a shift position out of a forward gear position, a reverse gear position, and a non-traveling gear position of the automatic transmission;
- an oil pressure sensor to detect an oil pressure of at least one hydraulic engagement mechanism of the automatic transmission, the at least one hydraulic engagement mechanism to have a first oil pressure to engage at least two of a plurality of rotating elements of a plurality of planetary gear mechanisms of the automatic transmission to set the reverse gear position and to have a second oil pressure lower than the first oil pressure to disengage the at least two of the plurality of rotating elements to set the forward gear position or the non-traveling gear position, the plurality of planetary gear mechanisms including at least one of the plurality of rotating elements connected to a mechanical engagement mechanism to regulate a rotation of the at least one of the plurality of rotating elements, the mechanical engagement mechanism having regulation states out of:
    - a first state in which the at least one of the plurality of rotating elements is rotatable only in a first direction and the forward gear position is to be established; and
    - a second state in which the at least one of the plurality of rotating elements is not rotatable in both of the first direction and a second direction opposite to the first direction and the reverse gear position is to be established,
  the non-traveling gear position to be established in the first state or in the second state; and
- a processor programmed to switch the regulation states of the mechanical engagement mechanism from the second state to the first state when the oil pressure that is detected by the oil pressure sensor becomes lower than a predetermined oil pressure after the shift position sensor detects switching the shift position from the reverse gear position to the non-traveling gear position.

8. The control device according to claim 7, wherein
the processor is to switch the regulation states of the mechanical engagement mechanism from the second state to the first state after the oil pressure that is detected by the oil pressure sensor continues to be lower than the predetermined oil pressure for a prescribed time.

9. The control system according to claim 7, wherein
the processor is
- to determine whether the second state is maintained or switching to the first state is performed after the shift position sensor detects switching from the reverse gear position to the non-traveling gear position, and
- to switch the regulation states of the mechanical engagement mechanism from the second state to the first state when the oil pressure that is detected by the oil pressure sensor becomes lower than the predetermined oil pressure after a determination is made that switching to the first state is performed.

* * * * *